C. R. HOTCHKISS.
TRACTION WHEEL.
APPLICATION FILED MAR. 3, 1919. RENEWED SEPT. 30, 1920.
1,361,331.
Patented Dec. 7, 1920.
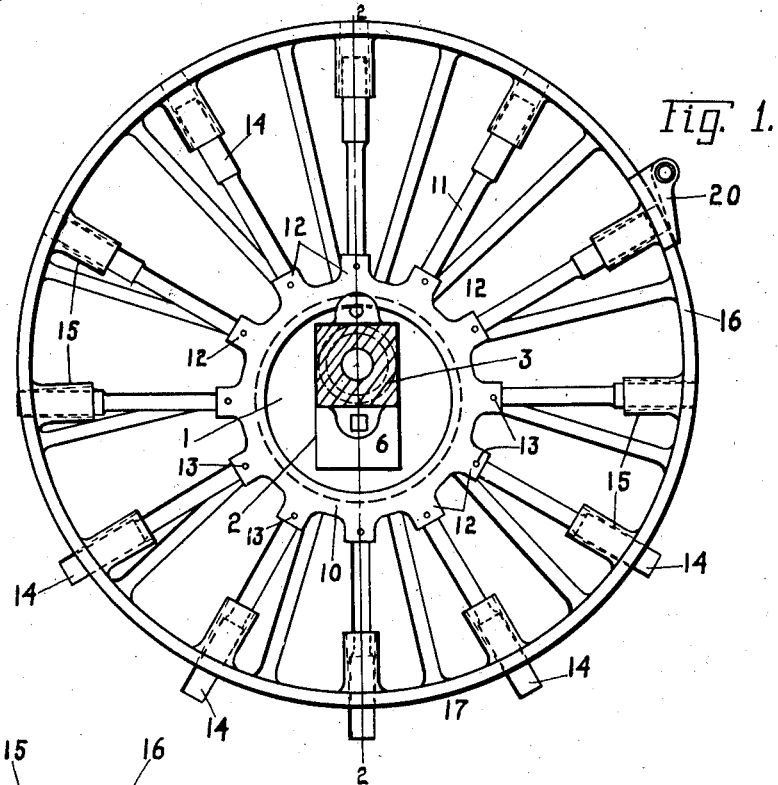
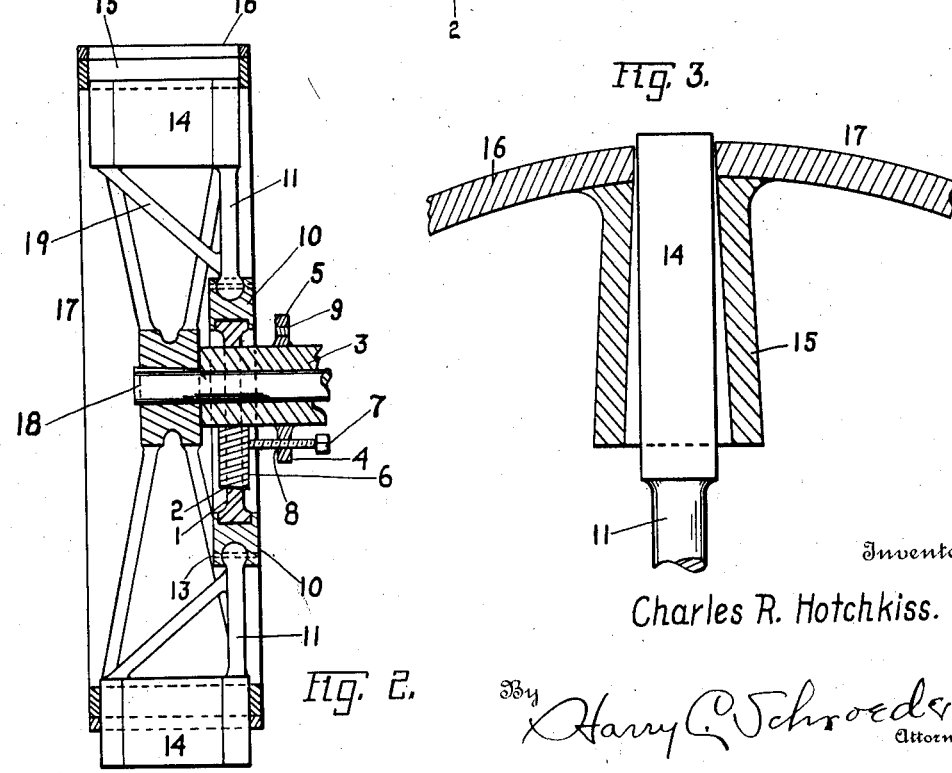
Inventor
Charles R. Hotchkiss.
By Harry C. Schroeder
Attorney

UNITED STATES PATENT OFFICE.

CHARLES R. HOTCHKISS, OF PLEASANTON, CALIFORNIA.

TRACTION-WHEEL.

1,361,331.         Specification of Letters Patent.       Patented Dec. 7, 1920.

Application filed March 3, 1919, Serial No. 280,304. Renewed September 30, 1920. Serial No. 413,895.

*To all whom it may concern:*

Be it known that I, CHARLES R. HOTCHKISS, a citizen of the United States, residing at Pleasanton, in the county of Alameda and State of California, have invented certain new and useful Improvements in Traction-Wheels, of which the following is a specification.

My invention is a grouser projecting and withdrawing device for tractor wheels.

My invention is illustrated in the accompanying drawing which forms a part of this specification and the appended claim.

Referring to the drawing:

Figure 1 is a side elevation of my invention applied to a tractor wheel.

Fig. 2 is a sectional view of my invention as shown in Fig. 1 taken on line 2—2 of said figure.

Figure 3 is a fragmentary sectional view of the grouser and grouser rim bearing.

In the drawing, 1 indicates an eccentric provided with a vertical slot 2 through which extends an axle housing 3, on which are lugs 4 and 5. A block 6 fits within the slot 2, the lower edge of which is inclined and engages the lower edge of slot 2 which is also inclined. A set screw 7 extends through a threaded aperture 8 in lug 4 into engagement with block 6. By turning said set screw one way the block 6 is forced so that the engagement of its lower inclined edge with the lower inclined edge of the slot 2 causes the upper edge of the block and the upper edge of slot 2 to grip the axle housing 3 and clamp the eccentric securely on said axle housing. The lug 5 is provided with a threaded aperture 9 to receive set screw 7 if desired. On the eccentric 1 is turnably mounted a grouser hub 10 to which are connected the inner ends of grouser spokes 11 by means of ball and socket joints 12. Pivot pins 13 extend through the joints 12 parallel to the axis of eccentric 1, and pivot the spokes 11 to hub 10 so that they swing only in a plane at right angles to the axis of the eccentric 1. To the outer ends of spokes 11 are secured grousers 14 which are mounted in bearings 15 on the inside of the rim 16 of tractor wheel 17, said bearings extending through the wheel rim. The wheel 17 is journaled on axle 18 which extends through axle housing 3. Braces 19 are secured to the spokes 11 and to the grousers 14 to support the grousers firmly on said spokes. A scraper 20 may be pivoted above the axis of the wheel 17 to a suitable point on the tractor (not shown) for scraping the wheel 17.

As the wheel rotates the grouser hub 10 is also rotated on eccentric 1 which causes the grousers below the axis of the wheel to be projected outwardly through bearings 15 and through the wheel rim 16, and the grousers above the axis of the wheel to be withdrawn inside the wheel rim within the bearings 15. This leaves an unobstructed rim above the axis of the wheel and permits the scraper 20 to scrape the dirt off the rim.

When it is desired to operate the wheel with the grouser withdrawn from the rim of the wheel for use on the highway, it is necessary to substitute a smaller block for the block 6 and insert a block of equal size on the opposite side. This has the effect of centering the eccentric, and presenting a smooth surface on the wheel.

Having described my invention, I claim:

In combination with a tractor wheel and axle housing, an eccentric provided with a slot, the lower edge of which is inclined, and its upper end engaging the axle housing, a block fitting in said slot, the upper edge of the block engaging the axle housing and its lower edge being inclined and engaging the inclined lower edge of said slot, a set screw mounted on the axle housing for forcing said block within said slot, a hub on said eccentric, spokes connected to said hub, grousers on said spokes, and bearings in the rim of said wheel in which said grousers are slidably mounted.

In testimony whereof I affix my signature.

CHARLES R. HOTCHKISS.